US011963618B2

(12) United States Patent
Xiang et al.

(10) Patent No.: US 11,963,618 B2
(45) Date of Patent: Apr. 23, 2024

(54) FOLDABLE ELECTRIC BED FRAME

(71) Applicant: FLEXISPOT, INC., Livermore, CA (US)

(72) Inventors: Lehong Xiang, Zhejiang (CN); Tao Lin, Zhejiang (CN); Zhengjun Chen, Zhejiang (CN)

(73) Assignee: FLEXISPOT, INC., Livermore, CA (US)

( * ) Notice: Subject to any disclaimer, the term of this patent is extended or adjusted under 35 U.S.C. 154(b) by 0 days.

(21) Appl. No.: 17/507,813

(22) Filed: Oct. 22, 2021

(65) Prior Publication Data

US 2023/0000258 A1 Jan. 5, 2023

(30) Foreign Application Priority Data

Jun. 30, 2021 (CN) ........................ 202110734198.6

(51) Int. Cl.
*A47C 20/04* (2006.01)
*A61G 7/015* (2006.01)
*A61G 7/018* (2006.01)

(52) U.S. Cl.
CPC ............ *A47C 20/041* (2013.01); *A61G 7/015* (2013.01); *A61G 7/018* (2013.01)

(58) Field of Classification Search
CPC ....... A47C 20/041; A61G 7/015; A61G 7/018
USPC .............................................................. 5/616
See application file for complete search history.

(56) References Cited

U.S. PATENT DOCUMENTS

| | | | | | |
|---|---|---|---|---|---|
| 4,222,131 | A * | 9/1980 | Holdt | A47C 20/042 | 5/617 |
| 5,423,097 | A * | 6/1995 | Brule | A61G 7/015 | 403/324 |
| 5,444,880 | A * | 8/1995 | Weismiller | A61G 7/015 | 5/616 |
| 6,726,279 | B1 * | 4/2004 | Figel | A61G 5/1051 | 297/340 |
| 6,757,924 | B2 * | 7/2004 | Goodwin | A61G 13/0009 | 5/624 |
| 7,913,336 | B2 * | 3/2011 | Morin | A61G 7/018 | 5/616 |
| 9,066,603 | B2 * | 6/2015 | Mossbeck | A47C 20/04 | |
| 10,736,431 | B2 * | 8/2020 | Chung | A47C 19/025 | |
| 11,103,079 | B2 * | 8/2021 | Choi | A47C 20/041 | |
| 11,224,294 | B2 * | 1/2022 | Nava | A47C 20/041 | |
| 11,376,177 | B2 * | 7/2022 | Rigsby | A61G 7/0513 | |

(Continued)

FOREIGN PATENT DOCUMENTS

| | | | | |
|---|---|---|---|---|
| CN | 107781287 | * 3/2018 | A61F 5/042 |
| CN | 210330038 | * 4/2020 | A47C 20/04 |

*Primary Examiner* — Justin C Mikowski
*Assistant Examiner* — Luke Hall
(74) *Attorney, Agent, or Firm* — Pearne & Gordon LLP

(57) ABSTRACT

A foldable electric bed frame is provided which comprises a bottom frame and a push rod; a first board and a second board hinged to each other are disposed on the top of the bottom frame, one end of the push rod is rotatably connected to a side edge of the second board through a connection device which comprises a height adjusting piece and a height locking piece; a distance from the height adjusting piece to the second board in a working state is larger than a distance from the height adjusting piece to the second board in a folded state, and the height locking piece locks a position of the height adjusting piece in the working state.

6 Claims, 3 Drawing Sheets

(56) References Cited

U.S. PATENT DOCUMENTS

| | | | | |
|---|---|---|---|---|
| 11,413,201 | B2 * | 8/2022 | Zeng | A47C 17/1756 |
| 2005/0000020 | A1 * | 1/2005 | Schermel | A47C 20/04 5/507.1 |
| 2014/0259409 | A1 * | 9/2014 | Shih | A61G 7/002 5/600 |
| 2016/0022518 | A1 * | 1/2016 | Shih | A61G 7/015 5/616 |
| 2019/0021511 | A1 * | 1/2019 | Shih | A47C 20/041 |
| 2019/0191890 | A1 * | 6/2019 | Huang | A47C 20/10 |
| 2021/0186223 | A1 * | 6/2021 | Zeng | A47C 17/162 |
| 2022/0095803 | A1 * | 3/2022 | Wang | A47C 20/041 |
| 2022/0133049 | A1 * | 5/2022 | Bellingroth | A47C 20/04 5/131 |
| 2022/0183907 | A1 * | 6/2022 | Liu | A61G 7/015 |
| 2022/0287474 | A1 * | 9/2022 | Wang | A47C 20/04 |
| 2022/0354265 | A1 * | 11/2022 | Wang | A47C 19/122 |

* cited by examiner

FOLDABLE ELECTRIC BED FRAME

CROSS REFERENCE TO THE RELATED APPLICATIONS

This application is based upon and claims priority to Chinese Patent Application No. 202110734198.6, filed on Jun. 30, 2021, the entire contents of which are incorporated herein by reference.

TECHNICAL FIELD

The present invention relates to the field of electric bed technologies, and in particular to a foldable electric bed frame.

BACKGROUND

Along with improvement of social economic development and life level, people have higher and higher requirements for functions of beds. In order to lift up a back or legs of a human body so as to increase comfort or help an old person to sit up, an electric bed with two end heights of a bed board adjustable emerges. Generally, an electric bed includes a back board for lifting up a back, a middle board for supporting hips and a leg board for supporting legs. Nowadays, more and more electric beds appear in places such as home, hospital and sanatorium. Along with increasingly-worsening aging of society and faster pace of lives of young persons, time for taking care of old persons becomes less and less. Smart electric beds with humanization designs can provide some assistance to the lives of the old persons. Usually, a foldable structure is employed in the electric beds available on market to facilitate transportation.

Because a push rod needs to have a large push force as required by a bed board of an electric bed, a bed frame of the electric bed may be deformed, leading to failure to lift up the bed board. In order to gain a good structural force condition, an angle of inclination of the push rod is usually increased because a larger angle of inclination of the push rod means a smaller push force is desired by the bed board of the electric bed. However, mounting positions of two ends of the existing push rod are basically fixed, and thus a thickness of the bed board of the electric bed has to be made larger in order to increase the mounting angle of inclination of the push rod. Along with increase of the thickness of the bed board, the transportation costs for the package of folded bed board will be increased by folds.

Therefore, how to reduce a thickness of a folded bed board in a case of increasing a mounting angle of inclination of a push rod becomes an urgent problem to be solved at present.

SUMMARY

The present invention aims to provide a foldable electric bed frame to solve the problem that transportation cost is increased for an increased thickness of a folded bed board resulting from increase of an angle of inclination of a push rod in the prior art.

In order to achieve the above object, the present invention employs the following basic solution: provided is a foldable electric bed frame, comprising a bottom frame and a push rod. A first board and a second board hinged to each other are disposed on the top of the bottom frame, a second board is fixedly connected to the bottom frame, a side of the bottom frame away from the first board is hinged with a third board, one end of the push rod is hinged at the bottom of the first board, and the other end of the push rod is rotatably connected to a side edge of the second board through a connection device. The connection device includes a height adjusting piece and a height locking piece. A distance from the height adjusting piece to the second board in a working state is larger than a distance from the height adjusting piece to the second board in a folded state, and the height locking piece locks a position of the height adjusting piece in the working state.

The working principle of the solution is described below: when the bed frame is to be transported, the bed frame will be folded between the second board and the third board to reduce a transportation area. The push rod will be located between an upper plane where the first board and the second board are located and a lower plane where the third board is located after the bed frame is folded. But the thickness of the folded bed frame will be increased. In order to reduce the thickness, it is required to set a longitudinal height of an end of the push rod relative to the bottom frame to be adjustable. The bed frame includes three states, i.e. a folded state, an unfolded state and a lifted state. The lifted state and the unfolded state belong to the working state. In the working state, the distance from the height adjusting piece to the second board is made larger to help the bed frame to have a good force-bearing condition. In the folded state, the distance from the height adjusting piece to the second board is made smaller to reduce the thickness of the folded bed board, thus increasing a goods transportation volume.

The solution has the following beneficial effects: the distance from the height adjusting piece to the second board is set to be adjustable, such that the bed frame has a smaller thickness after being folded while obtaining a good force-bearing condition. Further, the bed frame is easy and flexible to use, and no dismounting is required for the push rod at the time of folding, thus saving time and labor force.

Furthermore, a thickness of a side edge of the second board is larger than that of a middle region, the side edge of the second board is fixedly connected with a fixing piece, and the bottom of the fixing piece has a protrusion abutted against the bottom of the side edge of the second board. The large thickness of the second board facilitates mounting the fixing piece and increasing a bearing capacity of the second board. The protrusions of the bottom of the fixing piece are abutted against the bottom of the side edge of the second board to help prevent the fixing piece from falling off.

Furthermore, the fixing piece includes a second top plate and second side plates located at both sides of the second top plate and perpendicular to the second top plate. The second top plate is fixedly connected with outer sides of the second side plates, and the protrusion is located on the two second side plates respectively. The top of the fixing piece is hinged with a side edge of the first board, and the bottom of the fixing piece is connected with the height adjusting piece through bolt and nut. The connection of bolt and nut is convenient.

Furthermore, the height adjusting piece has vertical strip-shaped slide grooves, and the bolt at the bottom of the fixing piece can penetrate through the vertical strip-shaped slide grooves and slide freely in the slide grooves. The strip-shaped slide groove can be easily processed with a smaller amount of material.

Furthermore, the height locking piece is a limiting block at a side of the height adjusting piece. The other side of the height adjusting piece is hinged with an end of the push rod. In the working state, the limiting block is abutted against an inner side of the side edge of the second board, such that a height and an angle of the height adjusting piece are locked. The height and the angle of the height adjusting piece can be locked using the limiting block by rotating the height adjusting piece. This way, automatic locking function is implemented. Compared with the case that manual adjustment is made by tightening a screw in the prior art, this adjustment manner is more convenient and flexible.

Furthermore, the limiting block has a sloping surface attached to the side edge of the second board, and the sloping surface can be well attached to a side surface of the second board.

Furthermore, the height adjusting piece includes a bottom plate and clamping plates located at both sides of the bottom plate and perpendicular to the bottom plate. A middle part of each of the two clamping plates has an upwardly-convex bulge in which the slide groove is disposed, and the limiting block is disposed at a side of the clamping plate. The disposal of the bulge increases a length of the slide groove so as to increase a variable height of the height adjusting piece.

Furthermore, an anti-collision pad is fixedly connected on the limiting block to improve the durability of the limiting block.

Furthermore, a plurality of bed legs are detachably connected at the bottom frame and the bottom of the third board. The detachable bed legs increase a use height of the bed frame and may be dismounted for folding of the bed frame, bringing ease of use.

BRIEF DESCRIPTIONS OF THE DRAWINGS

DETAILED DESCRIPTIONS OF EMBODIMENTS

Figure 1:
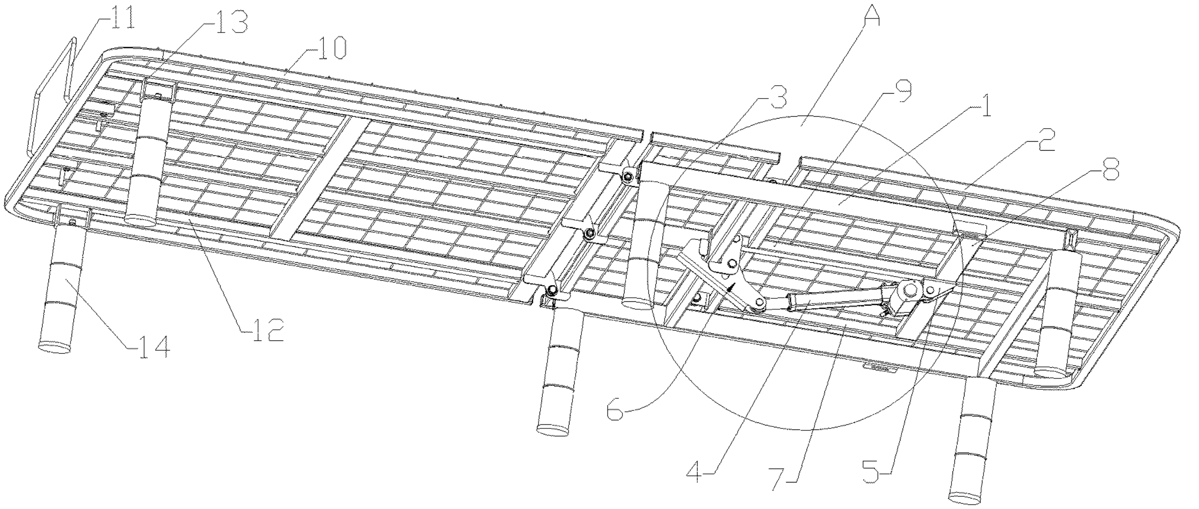
FIG. 1 is a structural schematic diagram of a foldable electric bed frame in an unfolded state according to the present invention.

Detailed descriptions will be made below in combination with specific embodiments.

Numerals of the drawings are described below: bottom frame 1, back board 2, middle board 3, push rod 4, fixed connection seat 5, rotary connection seat 6, fixing piece 61, second top plate 611, second side plate 612, rotary piece 62, bottom plate 621, clamping plate 622, bulge 6221, slide groove 6222, limiting block 6223, sloping surface 6224, first reinforcing pipe 7, middle pipe 8, basic pipe 9, leg board 10, leg guard bar 11, second reinforcing pipe 12, a bed leg welding sheet 13, and bed leg 14.

Figure 2:
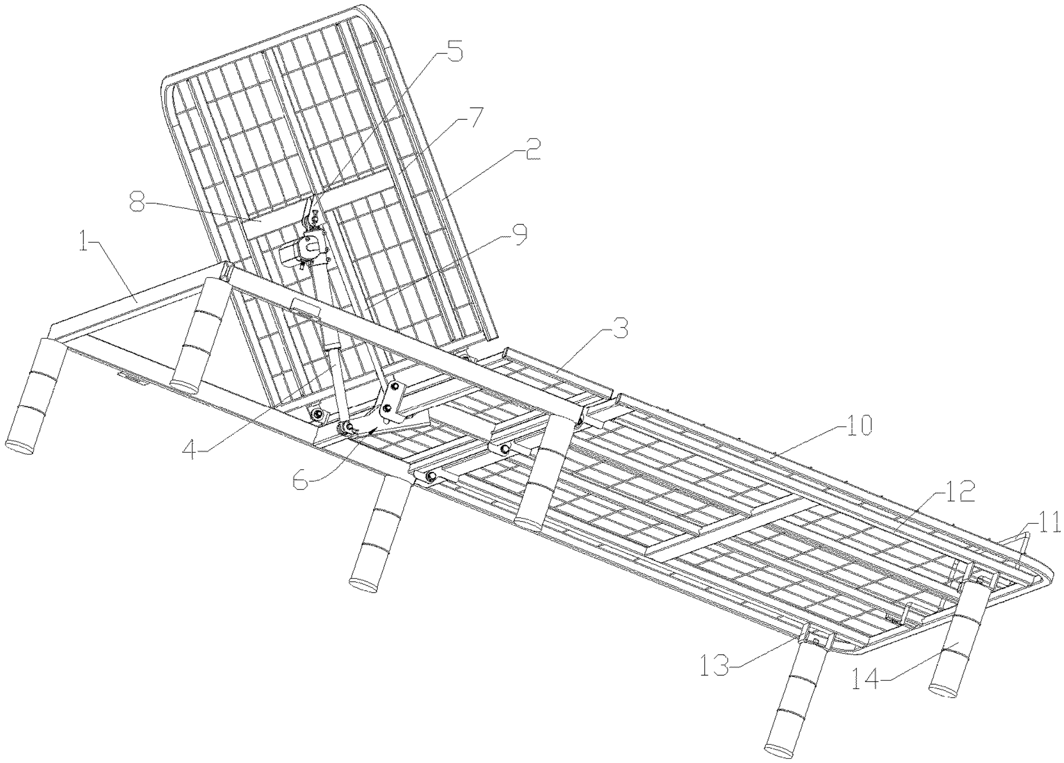
FIG. 2 is a structural schematic diagram of a foldable electric bed frame with a back board lifted according to the present invention.
Figure 3:
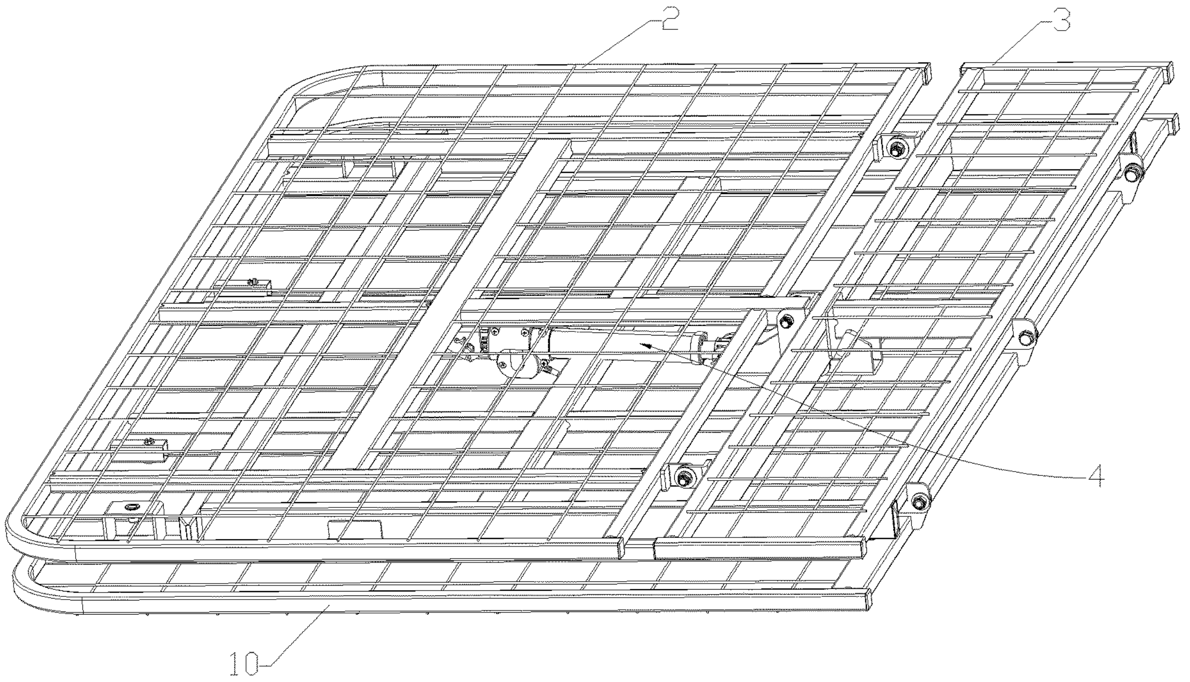
FIG. 3 is a structural schematic diagram of a foldable electric bed frame in a folded state according to the present invention.
Figure 4:
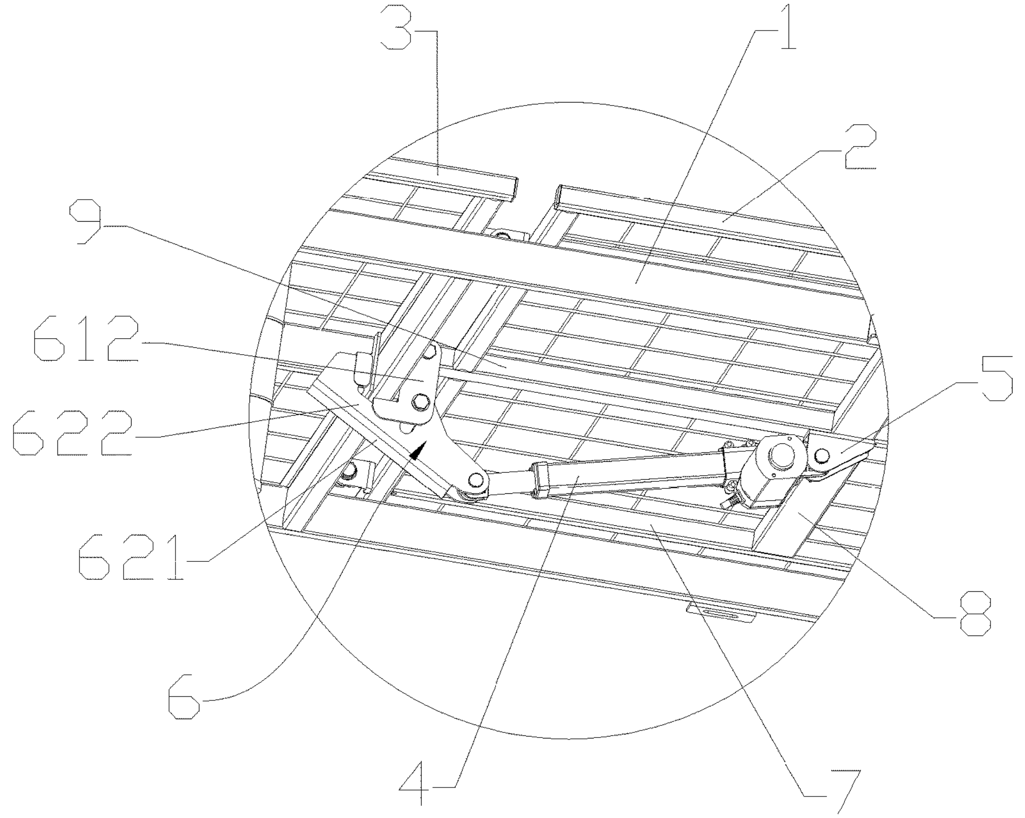
FIG. 4 is a partially enlarged view of position A in FIG. 1.
Figure 5:
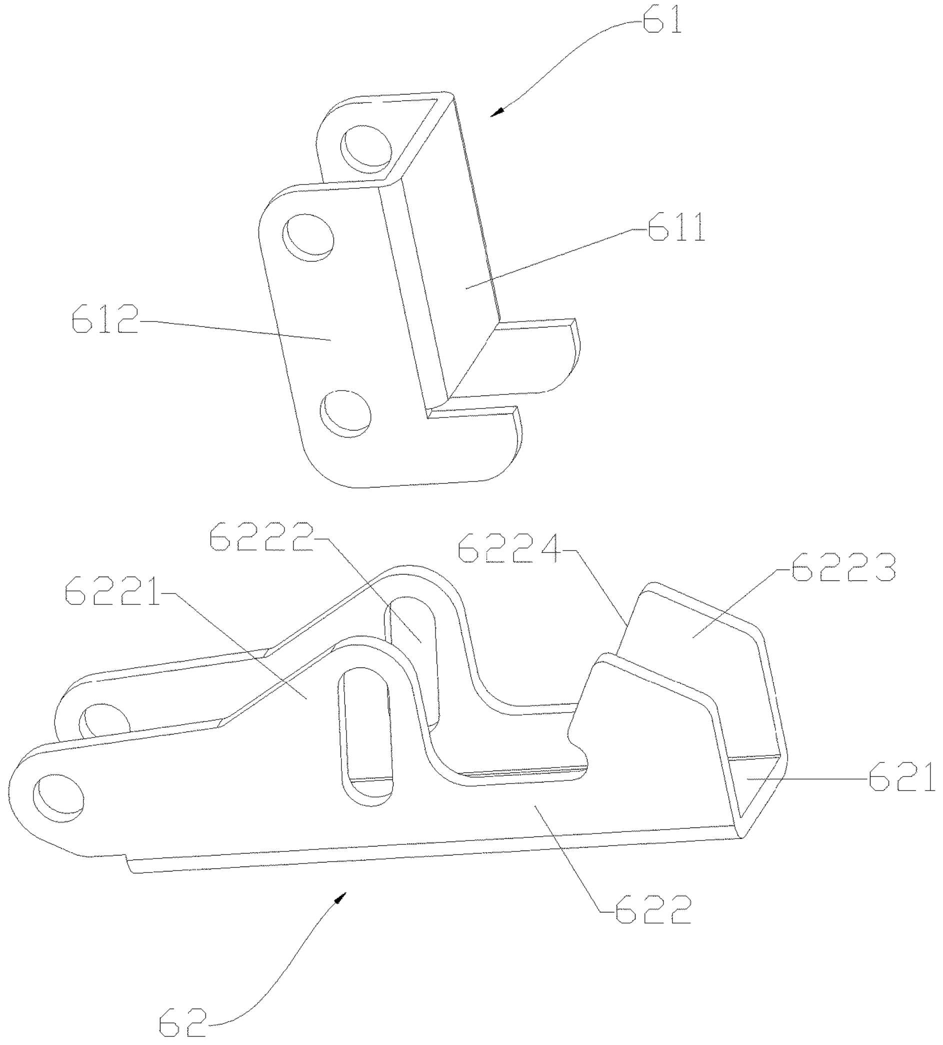
FIG. 5 is a structural schematic diagram of a fixing piece and a rotary piece in a foldable electric bed frame according to the present invention.
Figure 6:
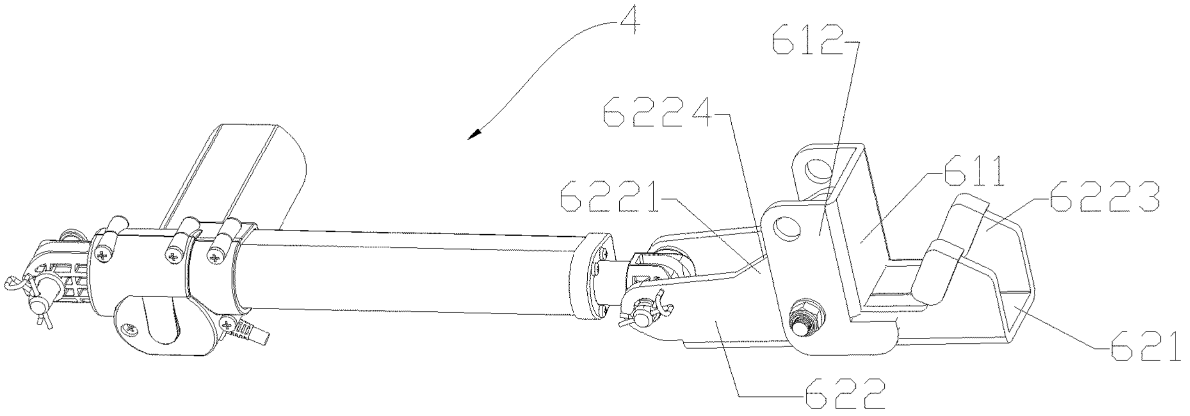
FIG. 6 is a structural schematic diagram of a push rod in a foldable electric bed frame according to the present invention.

In an embodiment, as shown in FIGS. 1-6, provided is a foldable electric bed frame, comprising a rectangular bottom frame 1, the top of the bottom frame 1 is connected with a first board and a second board that are hinged to each other. The first board is specifically a back board 2 for lifting up a back of a human body; the second board is specifically a middle board 3 for supporting hips of a human body, the middle board 3 is fixed on the bottom frame 1. A thickness of a side edge of the middle board 3 is larger than that of a middle region, a push rod 4 for rotating up the back board 2 is disposed under the back board 2, an motor end of the push rod is fixedly connected to the bottom of the back board 2 through a fixed connection seat 5, and a tail end of the push rod is connected to a side edge of the middle board 3 through a connection device which forms in various ways, and this embodiment adopts a relatively simple stricture of the connection device as a rotary connection seat 6.

The fixed connection piece 5 is a metal piece with a U-shaped cross section, including a first top plate and first side plates located at both sides of the first top plate and perpendicular to the first top plate. The first side plates are connected with the motor end of the push rod through a pin shaft respectively, a sealing and wear-proof mounting bushing is disposed between the first side plates and the motor end of the push rod, and an anti-loosening R-shaped pin is further disposed on the motor end of the push rod.

The rotary connection seat 6 includes a fixing piece 61 and a rotary piece 62. The fixing piece 61 is a metal piece with a U-shaped cross section, including a second top plate 611 and second side plates 612 located at both sides of the second top plate 611 and perpendicular to the second top plate 611. The second top plate 611 is welded with a side surface of a side edge of the middle board 3 close to the back board 2, and the bottom of the second top plate 611 has a protrusion abutted against the bottom of the side edge of the middle board 3. The rotary piece 62 includes a bottom plate 621 and clamping plates 622 located at both sides of the bottom plate 621 and perpendicular to the bottom plate 621. A middle part of each of the two clamping plates 622 has an upwardly-convex bulge 6221 in which a vertical strip-shaped slide groove 6222 for the rotary piece 62 to change its distance from the middle board 3 is disposed. An upwardly-protruding limiting block 6223 is disposed at a side of the clamping plate 622 away from the tail end of the push rod, and a sloping surface 6224 is disposed at a side of the limiting block 6223 close to the bulge 6221, so as to abut against a side surface of the middle board 3 when a height of the rotary piece 62 is locked, thereby limiting the rotation of the push rod. An anti-collision pad is disposed at the sloping surface 6224, and an anti-collision reinforcing sheet is welded at a position of the middle board 3 corresponding to the sloping surface 6224 of the limiting block 6223. An accommodation space for accommodating the side edge of the middle board 3 and rotating the rotary piece 62 is formed between the bulge 6221 and the limiting block 6223. Ends of the two clamping plates away from the limiting block 6223 are connected with the tail end of the push rod through a pin shaft. A sealing and wear-proof mounting bushing is disposed between the clamping plates 622 and the tail end of the push rod. An anti-loosening R-shaped pin is further disposed at the tail end of the push rod. The bottom of the second side plates 612 of the fixing piece 61 is connected with the rotary piece 62 through bolt and nut, that is, the bolt is penetrated through the slide grooves 6222 of the rotary piece 62. In use, a position of the bolt in the slide grooves 6222 may be adjusted to adjust a position of the rotary piece 62 relative to the middle board 3. The bottom plate 621, the clamping plate 622 and the bulge 6221 provided with the slide groove 6222 on the rotary piece 62 are height adjusting members, and the limiting block 6223 on the rotary piece 62 is a height locking member.

The back board 2 is a rectangular meshed board, two reinforcing pipes 7 parallel to the push rod 4 are welded at both sides of the back board 2, a middle pipe 8 perpendicular to the two first reinforcing pipes 7 is welded between middle parts of the two first reinforcing pipes 7, and a basic pipe 9 perpendicular to the middle pipe 8 is welded at a middle part of the middle pipe 8. A free end of the basic pipe 9 is connected to the top of the second side plates 612 of the fixing piece 61 through bolt and nut, and a position of the middle pipe 8 corresponding to the basic pipe 9 is welded with the first top plate of the fixed connection seat 5. The middle pipe 8 is disposed at the middle part of the back board 2 to enable the back board 2 to receive a more uniform force, avoiding deformation of the back board resulting from lifting. Two L-shaped metal pieces are welded at a side surface of the back board 2 close to the middle board 3, and the same two L-shaped metal pieces are also welded at a side surface of the middle board 3 close to the back board 2, and the L-shaped metal pieces of the back board 2 are rotatably connected with the L-shaped metal pieces of the middle board 3 through bolt and nut.

A side surface of the bottom frame 1 away from the back board 2 is connected with a third board through bolt and nut and metal pieces, the third board is specifically a leg board 10 for supporting legs of a human body. The leg board 10 is a rectangular meshed board. A leg guard bar 11 for preventing legs from falling to the ground is mounted at a side edge of the leg board 10 away from the middle board 3. Two second reinforcing pipes 12 parallel to the push rod 4 are welded at both sides of the bottom of the leg board 10, a bed leg welding sheet 13 for increasing height is welded at the bottom of one end of the two second reinforcing pipes 12 away from the middle board 3, and a bed leg 14 is detachably connected at the bottom of the bed leg welding sheet 13. A bed leg 14 is detachably connected at a bottom surface of each of four corners of the rectangular bottom frame 1 through a screw. The detachable disposal allows the bed legs 14 to be removed when the bed frame is to be folded for transportation, thus increasing the transportation volume. When unfolded, the back board 2, the middle board 3 and the leg board 10 are located in a same horizontal plane, and the middle plate 3 is located between the back board 2 and the leg board 10. In folded state, the back board 2 and the middle board 3 are located in a same plane, and the push rod 4 is located between the back board 2 and the leg board 10 to facilitate packaging. Further, an area formed by the back board 2 and the middle board 3 is equal to an area of the leg board 10.

The specific implementation process is described below: in the folded state, a distance from the rotary piece 62 to the middle board 3 is shortest, and the tail end of the push rod and the rotary piece 62 are in a disconnected state; at this time, the bolt at the bottom of the fixing piece 61 is located at the very bottoms of the slide grooves 6222 of the rotary piece 62, and the longitudinal height between the tail end of the push rod and the bottom frame 1 is the smallest, thus facilitating packaging. The side edge of the middle board 3 is located in the accommodation space formed between the bulge 6221 of the clamping plate 622 and the limiting block 6223, and a given space is reserved between the sloping surface 6224 of the limiting block 6223 and the side surface of the middle board 3.

In use, the bed frame is firstly changed from the folded state to unfolded as a working state, that is, the leg board 10 is rotated along a hinging position with the middle board 3 until the back board 2, the middle board 3 and the leg board 10 are in a same horizontal plane, and then the tail end of the push rod is hinged to the rotary piece 62 through an R-shaped pin, and then the rotary piece 62 is moved downwardly to enable the bolt at the bottom of the fixing piece 61 to move to the highest position of the slide grooves 6222; at this time, the distance from the rotary piece 62 to the middle board 3 is the largest, and then the push rod 4 is controlled to extend to allow the tail end of the push rod to move the rotary piece 62 downwardly in a direction away from the back board 2 until the clamping plates 622 of the rotary piece 62 and the sloping surface 6224 of the limiting block 6223 of the rotary piece 62 are abutted against the side surface of the middle board 3, thus locking up the height and the angle of the rotary piece 62; at this time, the back board 3 is at a critical point at which it is about to be lifted up by the working state; the push rod 4 is further extended; the clamping plates 622 of the rotary piece 62 are locked up and the position of the rotary piece 62 is fixed relative to the middle board 3, such that the motor end of the push rod pushes upward the back board 2 to rotate it toward the middle board 3; when the back board 2 is rotated to an appropriate angle, the extending of the push rod 4 is stopped.

The above descriptions are made only to some preferred embodiments of the present invention. The common knowledge such as those well-known specific technical solutions in the present technical solution is not detailed herein. It should be understood that many variations and improvements made by those skilled in the art without departing from the technical solution of the present invention shall all fall within the scope of protection of the present invention. These variations and improvements will not affect the implementation effect of the present invention and the applicability of the present invention. The scope of protection of the present invention is indicated by the appended claims. The recordings of the specific implementations of the specification may be used to explain the contents of the claims.

The invention claimed is:

1. A foldable electric bed frame, comprising a bottom frame and a push rod; a first board and a second board hinged to each other are disposed on a top of the bottom frame, the second board is fixedly connected to the bottom frame, a side of the bottom frame away from the first board is hinged with a third board, a first end of the push rod is hinged at a bottom of the first board, and a second end of the push rod is rotatably connected to a side edge of the second board through a connection device, wherein the connection device includes a height adjusting piece and a height locking piece; the height adjusting piece is movably connected to the second board, the height adjusting piece is hinged with the second end of the push rod; a distance from a distal end of the height adjusting piece to the second board in a working state is larger than a distance from the distal end of the height adjusting piece to the second board in a folded state, and the push rod moves the height adjusting piece to rotate so that the height locking piece locks a position of the height adjusting piece in the working state, wherein a thickness of the side edge of the second board is larger than that of a middle region;

the side edge of the second board is fixedly connected with a fixing piece, and a bottom of the fixing piece has a protrusion abutted against a bottom of the side edge of the second board, wherein the fixing piece comprises a top plate and two side plates located at both sides of the top plate and perpendicular to the top plate; the top plate is fixedly connected with an outer side of the side edge of the second board, and the protrusion is located on at least one of the two side plates respectively; a top of the fixing piece is hinged with a side edge of the first board, and the bottom of the fixing piece is connected with the height adjusting piece through a bolt and a nut, and wherein the height adjusting piece has vertical strip-shaped slide grooves, and the bolt at the bottom of the fixing piece penetrates through the vertical strip-shaped slide grooves and is configured to slide freely in the slide grooves.

2. The foldable electric bed frame of claim 1, wherein the height locking piece is a limiting block at a side of the height adjusting piece; another side of the height adjusting piece is hinged with the second end of the push rod; in the working state, the limiting block is abutted against an inner side of the side edge of the second board, such that a height and an angle of the height adjusting piece are locked.

3. The foldable electric bed frame of claim 2, wherein the limiting block has a sloping surface attached to the side edge of the second board in a working state.

4. The foldable electric bed frame of claim 2, wherein the height adjusting piece includes a bottom plate and clamping plates located at both sides of the bottom plate and perpendicular to the bottom plate; a middle part of each of the two clamping plates has an upwardly-convex bulge in which the slide groove is disposed, and the limiting block is disposed at a side of the clamping plate.

5. The foldable electric bed frame of claim 3, wherein an anti-collision pad is fixedly connected on the limiting block to improve the durability of the limiting block.

6. The foldable electric bed frame of claim 1, wherein a plurality of bed legs are detachably connected at the bottom frame and a bottom of the third board.

* * * * *